Patented Oct. 22, 1935

2,017,882

UNITED STATES PATENT OFFICE 2,017,882

ACETOTRICARBALLYLIC ESTER

Frithjof Zwilgmeyer, Hamburg, N. Y., assignor to National Aniline and Chemical Company, Inc., New York, N. Y., a corporation of New York No Drawing. Application April 18, 1930,
Serial No. 445,530

5 Claims. (Cl. 260—106)

This invention is concerned with the industrial application of acetotricarballylic esters, particularly to coating and plastic compositions. The invention also includes the production of certain new acetotricarballylic esters.

The acetotricarballylic esters correspond in structure and composition with the following general formula:

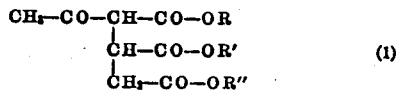   (1)

where R, R', and R'' each denote the same or different hydrocarbon radicals, more particularly alkyl radicals, e. g. $CH_3$ (methyl), $C_3H_7$ (normal propyl, isopropyl), $C_4H_9$ (normal butyl, isobutyl, secondary butyl, tertiary butyl), $C_5H_{11}$ (primary amyl, isoamyl, secondary amyl, tertiary amyl), etc. Those esters in which R represents a hydrocarbon radical which is different, either in composition or structure, from the hydrocarbon radicals which are represented by R' and R'' are new compositions of matter and constitute a part of the present invention. The acetotricarballylic esters are either viscous liquids or solids which fuse at a low temperature. They are insoluble in water but soluble in alcohol, acetic ether, acetone and other organic solvents. They have high boiling points at ordinary pressure and, as a rule, cannot be distilled without some decomposition except under a high vacuum, e. g., 1 to 10 mm. pressure. They are good solvents; for example, they dissolve unvulcanized rubber, cellulose esters, fusible resinous substances, etc.

In accordance with the present invention, the herein described esters of acetotricarballylic acid are used as modifying agents (e. g., solubilizing, flexibilizing, softening, or plasticizing agents), and especially as flexibilizers or plasticizers, for coating, plastic and molding compositions, more particularly artificial or synthetic coating compositions (including synthetic lacquers, particularly those comprising cellulose derivatives and especially cellulose esters) and synthetic plastic and molding compositions of the cellulose ester and/or the artificial or synthetic resin type. They can be readily incorporated in said compositions, particularly if said compositions are in the liquid or fusible state, to give homogeneous mixtures therewith; and, due to their high boiling point at ordinary pressures and to their negligibly low vapor pressures at ordinary temperatures, they are not sufficiently volatile to be eliminated to any considerable extent under such conditions as ordinarily prevail in the manufacture or use of said mixtures, or in the subsequent treatment to which the mixtures may be subjected. The new acetotricarballylic esters which correspond with the following formula:

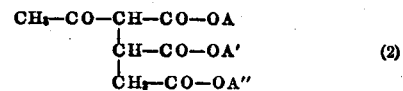   (2)

where A denotes a methyl ($CH_3$) or an ethyl ($C_2H_5$) group, and A' and A'' denote the same or different hydrocarbon radicals having more than two carbon atoms in their composition, particularly alkyl groups, e. g. $C_3H_7$, $C_4H_9$, $C_5H_{11}$, etc. are of particular value for use as modifying agents for coating and/or plastic compositions, particularly of the cellulose ester or resinous type, and especially those which comprise artificial or synthetic resins.

The acetotricarballylic esters for use in accordance with the present invention may be prepared by reacting an acetoacetic ester in the presence of sodium alcoholate and of an absolute alcohol with a halogensuccinic ester having the following general formula:

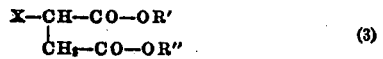   (3)

where X denotes chlorine or bromine, and R' and R'' have the same meaning as defined in Formula 1 above. The halogensuccinic esters employed as intermediate reagents in the preparation of acetotricarballylic esters may be prepared by heretofore known methods, or they may be prepared by treating an alcoholic solution of a di-ester of maleic or fumaric acid with dry hydrogen chloride, or by dissolving maleic anhydride in the alcohol of the ester desired, and treating the solution with dry hydrogen chloride.

The following example will illustrate the preparation of an acetotricarballylic ester.

*Example.*—23 parts (1 mol) of metallic sodium are dissolved in 400 parts of absolute ethyl alcohol, and to the cooled solution (room temperature) there is added 130 parts (1 mol) of ethyl acetoacetate and 292.5 parts (1 mol) chlorsuccinic diamyl ester. The mixture is allowed to stand at room temperature for one hour or more, or until no more sodium chloride separates out. The sodium chloride is separated by filtration and the excess alcohol removed from the filtrate by evaporation on a water bath. The oil-like residue is thoroughly washed with cold water. The impure oil-like product thus obtained comprises the monoethyl-diamylacetotricarballylate which has the following probable formula:

If desired, it may be rectified by distillation under a high vacuum. It is a viscous liquid which boils with slight decomposition at about 230° C. at 10 mm. pressure.

Other tri-esters of acetotricarballylic acid may be prepared in a similar manner. For example, if an equivalent amount of dibutyl chlorsuccinate, or dibutyl bromsuccinate, is used in place of diamyl chlorsuccinate, an oil-like product is obtained which boils, with some decomposition, at about 220° C. at 10 mm. pressure. It has the following probable formula:

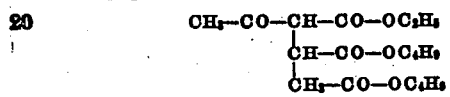

Other di-esters of chlor (or brom)—succinic acid may be employed, e. g., the methyl, propyl or phenyl ester, etc., and instead of the ethyl ester of acetoacetic acid there may be used the methyl, propyl, butyl, etc. ester.

In practice, the acetotricarballylic ester can be incorporated with coating compositions, for example, lacquers, such as the cellulose ester lacquers, solutions of natural or artificial gums or resins in various organic solvents, etc., at any stage prior to the application or use thereof. The coating composition with which the acetotricarballylic ester is combined or associated gives, upon hardening, a film or coating of superior strength and flexibility. The acetotricarballylic esters can be added to synthetic resinous compositions in their fusible, soluble form, or to the resin forming ingredients in the course of their reaction for the production of the fusible, soluble form. If desired, the modified resin may then be converted into the fully condensed, insoluble, infusible or hardened state by the application of heat and/or pressure, or in any other suitable manner for converting soluble, fusible resinous compositions into the insoluble, infusible or hardened condition. For example, a fusible, partially condensed product comprising a polyhydric alcohol and a polybasic acid, for instance, glycerine and a polybasic acid such as, for example, maleic, malic, succinic, tartaric or phthalic acid, may be prepared in the usual manner; about 5 to 30 per cent. by weight of an acetotricarballylic ester may be incorporated therewith, heat being applied, if necessary, to effect a homogeneous mixture; and the plasticized composition, with or without the addition of fillers, may then be hardened in the usual manner, for example, by hot molding.

The acetotricarballylic esters may be added in various proportions to coating and resinous compositions, it depending on the character of the composition as well as on the degree of plasticity desired in the final product. The esters may be used in combination or in association with resinous substances of various types, such as, for example, the ketone, furfural, cumaron, phenol-aldehyde, urea, aldehyde-amine, polybasic acid-polyhydric alcohol, etc., resinous compositions, especially those which are initially fusible and are capable of being subsequently hardened by heat. The resulting combinations can be cast, when in the fusible state, into suitable forms, or molds, and after hardening are tougher and more resistant to shock than the corresponding resins which are unassociated with the esters. They may be used in various ways in molding compositions, varnishes, etc., and in solution they may be applied on wire or other metal articles as an enamel, or incorporated with pigments and dyestuffs to give paints.

I claim:

1. An acetotricarballylic ester having the following probable formula:

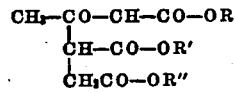

being a viscous liquid or low-melting solid, insoluble in water, soluble in alcohol, acetone and other organic solvents, and obtainable by reacting an acetoacetic ester having the formula:

with the halogensuccinic ester having the formula:

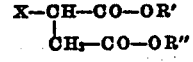

R, R' and R'' representing hydrocarbon radicals of which the hydrocarbon radical represented by R is different from the hydrocarbon radicals represented by R' and R'' and X representing chlorine or bromine.

2. An acetotricarballylic ester having the probable formula:

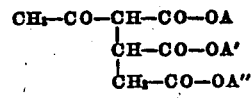

being a viscous liquid or low-melting solid, insoluble in water, soluble in alcohol, acetone and other organic solvents, and obtainable by reacting an acetoacetic ester having the formula:

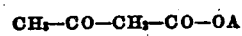

with a halogensuccinic ester having the formula:

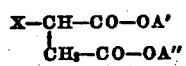

A denoting a methyl or ethyl group, A' and A'' each denoting a hydrocarbon radical containing more than two carbon atoms in its composition, and X denoting chlorine or bromine.

3. An acetotricarballylic ester having the following probable formula:

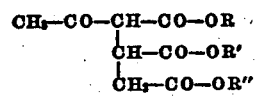

being a viscous liquid or low-melting solid, insoluble in water, soluble in alcohol, acetone and other organic solvents, and obtainable by reacting an acetoacetic ester having the formula:

with a halogensuccinic ester having the formula:

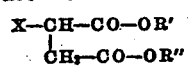

R denoting an alkyl group, R' and R'' each denoting a methyl, propyl, butyl, amyl or phenyl radical, and X denoting chlorine or bromine.

4. An acetotricarballylic ester having the following probable formula:

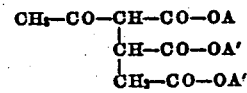

being a viscous liquid or low-melting solid, insoluble in water, soluble in alcohol, acetone and other organic solvents, and obtainable by reacting an acetoacetic ester having the formula:

$$CH_3-CO-CH_2-CO-OA$$

with a halogensuccinic ester having the formula:

$$X-CH-CO-OA'$$
$$|$$
$$CH_2-CO-OA''$$

A denoting a methyl, ethyl, propyl, butyl or amyl radical, A' and A'' each denoting a methyl, propyl, butyl, amyl or phenyl radical, and X denoting chlorine or bromine.

5. An acetotricarballylic ester having the following formula:

$$CH_3-CO-CH-CO-OA$$
$$|$$
$$CH-CO-OA'$$
$$|$$
$$CH_2-CO-OA''$$

being a viscous liquid or low-melting solid, insoluble in water, soluble in alcohol, acetone and other organic solvents, and obtainable by reacting an acetoacetic ester having the formula:

$$CH_3-CO-CH_2-CO-OA$$

with a halogensuccinic ester having the formula:

$$X-CH-CO-OA'$$
$$|$$
$$CH_2-CO-OA''$$

A denoting a methyl or ethyl group, A' and A'' each denoting an alkyl radical having more than two carbon atoms in its composition, and X denoting chlorine or bromine.

FRITHJOF ZWILGMEYER.